UNITED STATES PATENT OFFICE.

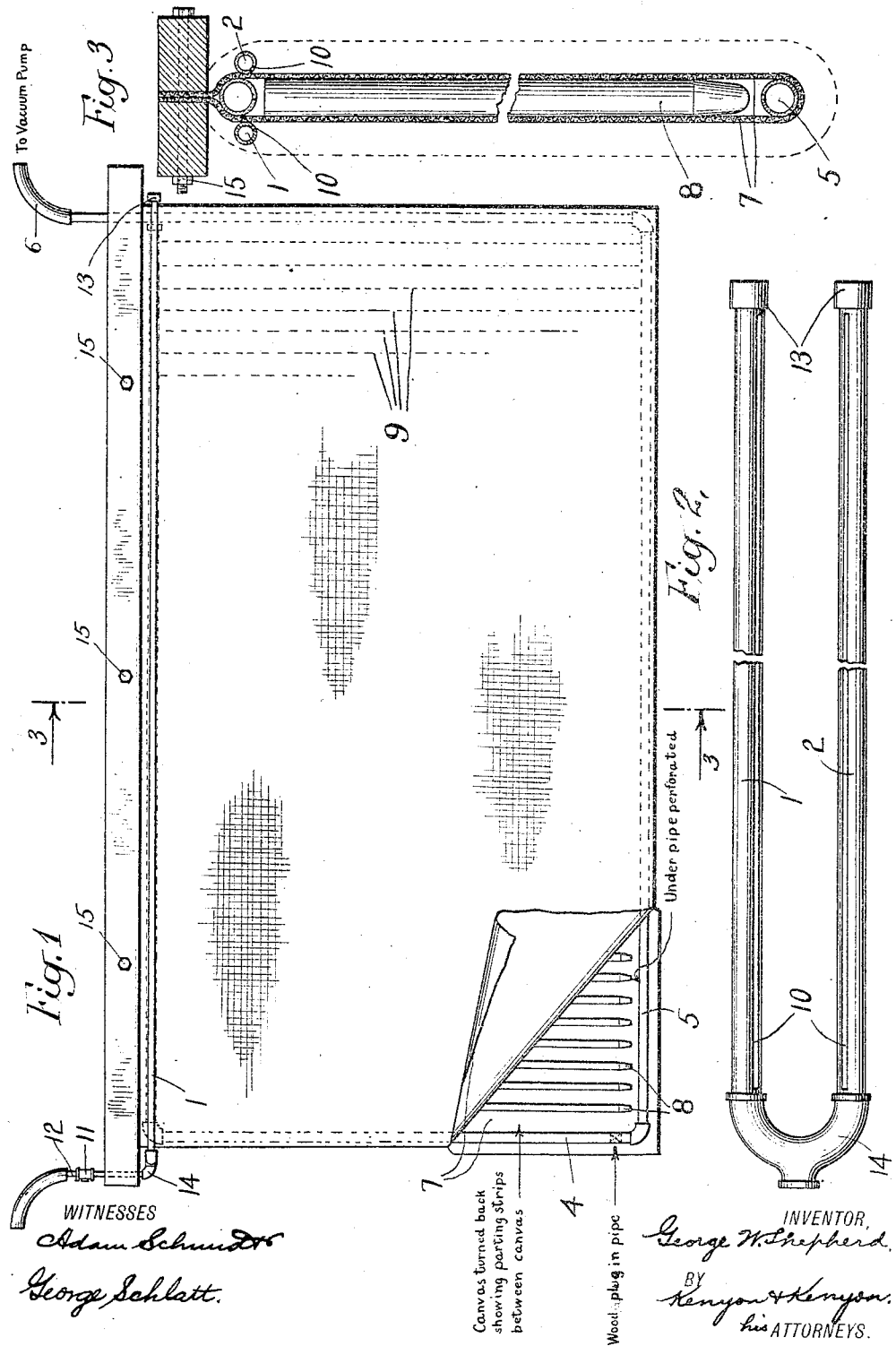

GEORGE W. SHEPHERD, OF NEW YORK, N. Y., ASSIGNOR TO THE BUTTERS PATENT VACUUM FILTER COMPANY INC., A CORPORATION OF NEVADA.

FILTERING-LEAF.

1,096,133.  Specification of Letters Patent.  Patented May 12, 1914.

Original application filed May 1, 1913, Serial No. 764,842. Divided and this application filed September 3, 1913. Serial No. 787,838.

*To all whom it may concern:*

Be it known that I, GEORGE W. SHEPHERD, a citizen of the United States, and a resident of the city, county, and State of New York, have invented new and useful Improvements in Filtering-Leaves, of which the following is a specification.

The object of my invention is to effectively and rapidly dislodge slime cakes which are formed on the filter-surfaces of filter leaves during the process of filtering compounds, resulting from the well known cyanid process of treating ores. My invention may be used with analogous compounds, of course.

My invention consists in applying water under pressure externally of the filter leaf in such a way that the time for the cake dislodgment is materially shortened and the surface of the leaf is thoroughly cleansed.

Specifically, my invention consists in means for applying water under pressure near the top of the leaf and underneath the surface of the cake, between the cake and the filter medium.

By my invention the cake may be completely dislodged without any internal pressure whatever, thus saving the filter medium, the wear and tear incident to internal pressure, but it may be used with internal pressure also, if desired.

My apparatus for cake dislodgment has a great advantage over other similar apparatus in that they apply the spray or sheet of water on to the outside of the cake, while with my apparatus the water is applied beneath the surface of the cake or inside the cake. In using former apparatus the tendency of the water was to make the cake adhere more closely to the filter leaf by reason of the external pressure and wetting of the cake caused by the spray and the cake would hang on to the filter medium until washed away or carried off piece-meal or in a solution, so to speak. With my apparatus I force the cake away from the filter medium in bulk by pressure and do not depend upon piece-meal washing away of the cake. It is sometimes found that when pressure is created between the cake and the filter medium they are separated a distance below the opening in the dislodging pipes before the cake is separated at its top, thus confining the pressure for a short time between the cake and the medium. This is for a short time only, however, so that when the top is separated the cake comes clear of the medium thereby cleaning the entire surface in a very short time.

My invention has many advantages, chief of which is the saving in time and in amount of water used. It is to be remembered that water is valuable in a large plant and considerable saving thereof is greatly to be appreciated.

Other advantages of my invention will be apparent after reading the following detailed description taken in connection with the accompanying drawings, in which—

Figure 1 is a side elevation of a filter leaf embodying my invention; Fig. 2 is a bottom view of piping used for supplying water to dislodge the cake; and Fig. 3 is an enlarged section on line 3—3 of Fig. 1 with a cake thereon shown in dotted lines.

In Fig. 1, 4 represents the frame, which may be of any construction, but it preferably consists of tubing, the bottom member 5 of which is perforated or slotted, the perforations or slot opening into the interior of the leaf. This member is connected in this instance through the right-hand end frame-member with a vacuum pump, not shown, through any suitable connection, as 6. 7—7 are filter media, one on each side of the frame. These are held apart during the filtering process by any suitable spacing means such as wooden sticks 8. The filter media are stitched together, as shown, at dotted lines 9, for the purpose of holding the spacing sticks in place. Any number of sticks may be placed between successive stitched portions. This stitching is useful in preventing ballooning if internal pressure is placed on the leaf. The upper part of the filter media 7 is securely clamped between the headers 16 by means of bolts 15.

1, 2 represent small pipes running along the upper portion of the leaf. Each of these pipes has openings or a slot 10 along the length thereof extending substantially the whole length of the leaf. These slots or rows of openings are preferably placed on the lower side of the pipes and slightly inward toward the filter surface so that the water will be applied in the direction thereof. The outer end of the pipes is closed by an ordinary cap 13. The pipes are joined by a suitable fixture 14 which is arranged to be connected to the supply pipe 12. It is desirable that the openings in the pipes 1, 2 be so arranged that they will lie beneath the surface of the cake (Fig. 3) which is formed during the filtering operation so that when water is admitted to the pipes it will be initially applied beneath the surface of the cake and between the cake and the filter media. It may be found desirable in some cases to protect these slots or openings so as to prevent the deposit, by sedimentation or otherwise, of particles therein. To that end a suitable valve, such as a check-valve 11, is placed in the pipe 12 through which water under pressure is admitted to the dislodging pipes 1 and 2. This valve is arranged to open toward the leaf and to close in the reverse direction so that there will be no movement of liquid into the pipe 12. The pipe 12 is connected with any suitable water supply under pressure.

While the dislodging pipes 1, 2 are shown as being on a level with the lower side of the top frame pipe it is to be understood that my invention is not limited to this arrangement, as they may be either above or below this point. These pipes may be of any desirable shape in cross-section.

It is understood, of course, that my invention may be used to dislodge cakes under many conditions. In fact, it can be used as a step in any of the processes of filtering now in use. Specifically it may be used to dislodge a cake while the leaf is submerged or while the leaf is suspended in air. It is also applicable whether or not internal water exists in the leaf, also with or without internal pressure, as for instance, after decanting the water bath. It may also be used with or without drying the cake by continued vacuum after the cake is removed from liquid.

While I have described my invention with the use of water, I have done so for convenience only, as air or other fluid may be used with satisfactory results, and all are within my invention. Water is generally used for this purpose, however, and is preferred.

My invention is not limited to any particular kind of pipe or passage for dislodging fluid as there may be many ways of accomplishing this. In its broadest aspects my invention includes all means for admitting fluid under pressure beneath the surface of the cake formation.

The matter claimed in this application is divided out of my application, Serial No. 764,842, filed May 1, 1913, in which the claims are directed to the process.

Having described my invention what I claim as new and desire to secure by Letters Patent is:—

1. A filter leaf comprising a frame, filter media carried thereby and cake-dislodging means connected with the upper portion of said leaf for directing water under pressure between the filter medium and its cake.

2. In a filter leaf, the combination of a frame, filter media carried thereby and cake-dislodging means mounted on the upper portion of said leaf and adapted to direct water under pressure beneath the surface of the cake.

3. In a filter leaf, the combination of a frame, filter media carried thereby and a cake-dislodging pipe mounted on said leaf and extending the length of said leaf having an opening to admit water under pressure between said cakes and said media to dislodge the cakes.

4. A filter leaf comprising a frame, filter media carried thereby, a cake-dislodging pipe on each side of the upper portion of said leaf and carried thereby and having an opening in its lower portion, said pipes being arranged to receive and discharge fluid under pressure beneath the surface of the cake.

5. A filter leaf comprising a frame, filter media carried thereby, a cake-dislodging pipe on each side of the upper portion of said leaf and carried thereby and having an opening in its lower portion, said pipes being arranged to receive and discharge fluid under pressure along the outer surface of said media beneath the surface of the cake.

6. A filter leaf comprising a frame, filter media carried thereby, a cake-dislodging pipe on each side of the upper portion of said leaf and carried thereby and having a slot in the lower portion thereof for discharging a continuous sheet of water under pressure beneath the surface of the cake.

7. A filter leaf comprising a frame, filter media carried thereby, a cake-dislodging pipe on each side of the upper portion of said leaf and carried thereby and having a slot in the lower portion thereof for discharging a continuous sheet of water under pressure between the cake and the filter medium.

In testimony whereof, I have signed my name to this specification, in the presence of two subscribing witnesses.

GEORGE W. SHEPHERD.

Witnesses:
 NEWTON A. BURGESS,
 EDWIN SEGER.